United States Patent
Hou et al.

(10) Patent No.: US 8,310,934 B2
(45) Date of Patent: Nov. 13, 2012

(54) METHOD AND DEVICE FOR CONTROLLING INFORMATION CHANNEL FLOW

(75) Inventors: Zhongming Hou, Shenzhen (CN); Jun Hu, Beijing (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/274,653

(22) Filed: Oct. 17, 2011

(65) Prior Publication Data

US 2012/0099431 A1    Apr. 26, 2012

(30) Foreign Application Priority Data

Oct. 22, 2010   (CN) .......................... 2010 1 0516087

(51) Int. Cl.
*G08C 15/00* (2006.01)
(52) U.S. Cl. .................. 370/236; 370/235; 370/384
(58) Field of Classification Search .................. None
See application file for complete search history.

(56) References Cited

U.S. PATENT DOCUMENTS

| | | | | |
|---|---|---|---|---|
| 6,654,342 B1* | 11/2003 | Dittia et al. | .................. | 370/229 |
| 6,735,173 B1* | 5/2004 | Lenoski et al. | ............... | 370/235 |
| 7,012,889 B1* | 3/2006 | Turner et al. | .................. | 370/229 |
| 7,317,733 B1* | 1/2008 | Olsson et al. | ................. | 370/466 |
| 2002/0199008 A1 | 12/2002 | Pecen et al. | | |
| 2007/0047443 A1 | 3/2007 | Desai et al. | | |
| 2010/0235663 A1* | 9/2010 | Olsson et al. | ................. | 713/323 |

FOREIGN PATENT DOCUMENTS

CN        101030926 A      9/2007

OTHER PUBLICATIONS

Cortina Systems, Inc. and Cisco Systems, Inc., "Interlaken Protocol Definition, A Joint Specification of Cortina Systems and Cisco Systems," Revision 1.2, Oct. 7, 2008, 52 pages.
Supplementary European Search Report dated (mailed) Feb. 16, 2012, issued in related Application No. 11008525.5-1525, Huawei Technologies Co., Ltd.
CP-002668446Cortina Systems Inc. and Cisco Systems Inc.: "Interlaken Protocol Definition A Joint Specification of Cortina Systems and Cisco Systems Revision 1.2", Interlaken Alliance, Oct. 7, 2008, 52 pages.
First Chinese Office Action (Translation); dated (mailed) Jun. 12, 2012; issued in related Application No. 201010516087.X (including Chinese version) (9 pgs.).

* cited by examiner

*Primary Examiner* — Donald Mills
(74) *Attorney, Agent, or Firm* — Finnegan, Henderson, Farabow, Garrett & Dunner, LLP (57) ABSTRACT

A method for controlling information channel flow is provided according to the present invention, and includes: receiving information from multiple information channels of a data sending device, where the multiple information channels are divided into at least two channel groups, and a group number is set for the at least two channel groups respectively; determining an information channel requiring flow adjustment in the multiple information channels, and obtaining a group number of a channel group including the information channel requiring flow adjustment; generating flow operation information; and sending the flow operation information to the data sending device.

5 Claims, 6 Drawing Sheets

METHOD AND DEVICE FOR CONTROLLING INFORMATION CHANNEL FLOW

CROSS-REFERENCE TO RELATED APPLICATIONS

This application claims priority to Chinese Patent Application No. 201010516087.X, filed on Oct. 22, 2010, which is incorporated herein by reference in its entirety.

FIELD OF THE INVENTION

The present invention relates to the field of communications, and in particular, to a method and a device for controlling information channel flow in the field of communications.

BACKGROUND OF THE INVENTION

No matter whether it is in wired network communication or in wireless network communication, in order to ensure effective data transmission between a data receiver and a data sender, flow control needs to be performed, so as to prevent overflow of data received by the data receiver because the amount of received data exceeds the processing capability of the data receiver or because of the storage space limitation of the data receiver, and to enable the data sender to reasonably determine, according to the processing capability of the data receiver, the speed of sending data, thereby effectively utilizing resources.

In various communication protocols, flow control mechanisms are concerned. For example, in an Interlaken protocol, an in-band flow control mechanism and an out-of-band flow control mechanism are provided. The Interlaken protocol is an optimized interconnection protocol developed by Cisco and Cortina in order to implement high bandwidth and reliable packet transmission. The protocol uses multiple serial links to establish a logical connection between components, and utilizes multiple information channels, the back pressure capability and the data integrity protection to improve the performance of communication equipment.

In the in-band flow control mechanism of the Interlaken protocol, the 40th bit to the 55th bit of a Burst control word and an Idle control word may be used to transfer in-band flow operation information, that is, flow operation information of information channels, so flow operation information of at most 16 information channels may be transferred once. When the number of the information channels is greater than 16 (assume that only information about the flow control at the information channel level is transmitted in a band), a first control word is used to transmit the flow operation information of 16 information channels of the first group, a second control word is used to transmit the flow operation information of 16 information channels of the second group, and so forth. After transmission of the flow operation information of information channels of the last group is completed, that is, after transmission of the flow operation information of the information channels is completed, transmission begins from the flow operation information of the 16 information channels of the first group again.

In a transmitted data stream, the proportion of a control word is generally far less than that of the data payload, and the refresh period of the control word is long. For the transmission of flow operation information of a certain information channel, in the worst case, that is, in the case that when the flow operation information of the information channel is updated, the moment of sending the flow operation information of the information channel is missed, the flow operation information of the information channel can be sent out in a next round only after waiting for the completion of sending the flow operation information of the information channel. When the number of the information channels is increased, the time required for the completion of sending the flow operation information of the information channels is increased, so that the delay for updating the flow operation information of the same information channel is increased.

Therefore, the flow operation information is transferred circularly according to a fixed sequence, the delay for updating the flow operation information of the same information channel is long, and it is difficult to update the flow operation information in time. Even if the flow operation information is not updated, the flow operation information occupies the control word transmission bandwidth, so that the transmission efficiency of the flow operation information of the information channel is further reduced.

SUMMARY OF THE INVENTION

Embodiments of the present invention provide a method and a device for controlling information channel flow, which are capable of improving transmission efficiency of flow operation information of an information channel, and updating the changed flow operation information of the information channel in time.

According to an embodiment of the present invention, the present invention provides a method for controlling information channel flow, and the method includes: receiving information from multiple information channels of a data sending device, where the multiple information channels are divided into at least two channel groups, and a group number is set for the at least two channel groups respectively; determining an information channel requiring flow adjustment in the multiple information channels, and obtaining a group number of a channel group including the information channel requiring flow adjustment; generating flow operation information, where the flow operation information includes the group number of the channel group including the information channel requiring flow adjustment, and control information of each information channel in the channel group, and the control information is used to indicate a flow control policy of the information channel; and sending the flow operation information to the data sending device.

According to another embodiment of the present invention, the present invention provides a method for controlling information channel flow, and the method includes: receiving information from multiple information channels of a data sending device, where the multiple information channels are divided into at least two channel groups, and a group number is set for the at least two channel groups respectively; determining an information channel requiring flow adjustment in the multiple information channels, and obtaining a group number of a channel group including the information channel requiring flow adjustment; generating flow operation information, where the flow operation information includes the group number of the channel group including the information channel requiring flow adjustment, and control information of each information channel in the channel group, and the control information is used to indicate a flow control policy of the information channel; and sending the flow operation information to the data sending device.

According to still another embodiment of the present invention, the present invention provides a device for controlling information channel flow, and the device includes: a receiving device, configured to receive information from multiple information channels of a data sending device, where the multiple information channels are divided into at least two channel groups, and a group number is set for the at least two channel groups respectively; a generation unit, configured to generate flow operation information when at least one information channel requires flow adjustment, where the flow operation information includes a group number of a channel group including the information channel requiring flow adjustment, and control information of each information channel in the channel group including the information channel requiring flow adjustment, and the control information is used to indicate a flow control policy of the information channel; and a sending unit, configured to send the flow operation information to the data sending device so as to perform flow control.

According to yet another embodiment of the present invention, the present invention provides a device for controlling information channel flow, and the device includes: a sending device, configured to send information to a data receiving device through multiple information channels, where the multiple information channels are divided into at least two channel groups, and a group number is set for the at least two channel groups respectively; a receiving unit, configured to receive flow operation information from the data receiving device, where the flow operation information includes a group number of a channel group including the information channel requiring flow adjustment, and control information of each information channel in the channel group including the information channel requiring flow adjustment, and the control information is used to indicate a flow control policy of the information channel; and a flow control unit, configured to perform a flow control operation on each information channel in the corresponding channel group according to the control information and the group number in the flow operation information.

According to the foregoing technical solutions in the present invention, information channels for information transmission are divided into at least two channel groups, and when the data receiving device determines that flow operation information of an information channel is changed, flow operation information of each information channel in the channel group with the changed flow operation information is preferentially transferred, instead of transferring flow operation information of each information channel in each channel group in sequence, so as to send the changed flow operation information to the data sending device in time, and enable the data sending device to timely update the changed flow operation information in combination with the group number sent together with the changed flow operation information, thereby improving the transmission efficiency of the flow operation information of the information channels and reducing the transmission delay of the flow operation information.

BRIEF DESCRIPTION OF THE DRAWINGS

To illustrate the technical solutions according to the embodiments of the present invention more clearly, the accompanying drawings for describing the embodiments of the present invention are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solutions according to the embodiments of the present invention will be clearly and fully described in the following with reference to the accompanying drawings. It is evident that the embodiments to be described are only a part of rather than all of the embodiments of the present invention. All other embodiments obtained by persons skilled in the art based on the embodiments of the present invention without creative efforts shall fall within the protection scope of the present invention.

First, a method 100 for controlling information channel flow according to an embodiment of the present invention is described with reference to FIG. 1.

Figure 1:
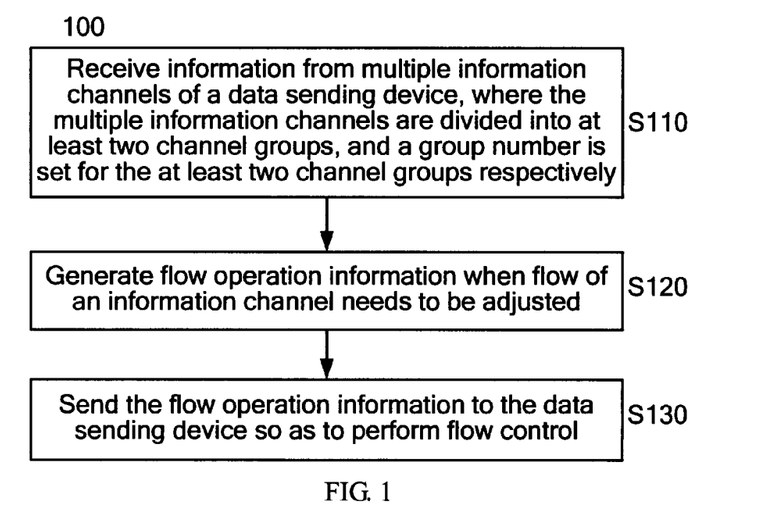
FIG. 1 is a flowchart of a method for controlling information channel flow according to an embodiment of the present invention.

As shown in FIG. 1, the method 100 includes the following steps.

S110: Receive information from multiple information channels of a data sending device, where the multiple information channels are divided into at least two channel groups, and a group number is set for the at least two channel groups respectively.

S120: Generate flow operation information when flow of information channels need to be adjusted, where the flow operation information includes a group number of a channel group in which the information channels require adjustment of a flow control policy, and control information of each information channel in the channel group. In the embodiment of the present invention, the control information is used to indicate a flow control policy of a data sending end for a corresponding information channel, such as allowing the corresponding information channels to send information, stopping the corresponding information channels from sending information, or increasing or reducing the flow, or even increasing or reducing the flow to a specific flow value; definitely, the control information may also be used to indicate that the data sending end does not need to adjust the flow of the corresponding information channel. Further, as an optional embodiment, the control information may use 1 bit, and when the control information is 1, it indicates that the data sending device is capable of sending information through the corresponding information channels, and when the control information is 0, it indicates that the data sending device needs to stop sending the information through the corresponding information channels.

S130: Send the flow operation information to the data sending device so as to perform flow control.

Information channels for information transmission are divided into at least two channel groups, each channel group has a different group number, and different channel groups may be distinguished through the group numbers. When a data receiving device detects abnormality in flow operation information of information channels in a channel group, flow operation information of the corresponding channel group is generated, so as to enable the data sending device to timely perform flow control according to each information channel's control information recorded in the flow operation information.

According to the method for controlling information channel flow in the embodiment of the present invention, information channels for information transmission are divided into at least two channel groups, and when the data receiving device determines that flow operation information of any information channel is changed, flow operation information of each information channel in the channel group with the changed flow operation information is preferentially transferred, instead of transferring flow operation information of each information channel in each channel group in sequence, so as to send the changed flow operation information to the data sending device in time, and enable the data sending device to timely update the changed flow operation information in combination with the group number that is sent together with the changed flow operation information, thereby improving the transmission efficiency of the flow operation information of the information channels and reducing the transmission delay of the flow operation information.

In the following, the Interlaken protocol is taken as an example to describe the method 100 for controlling information channel flow in detail.

Figure 2:
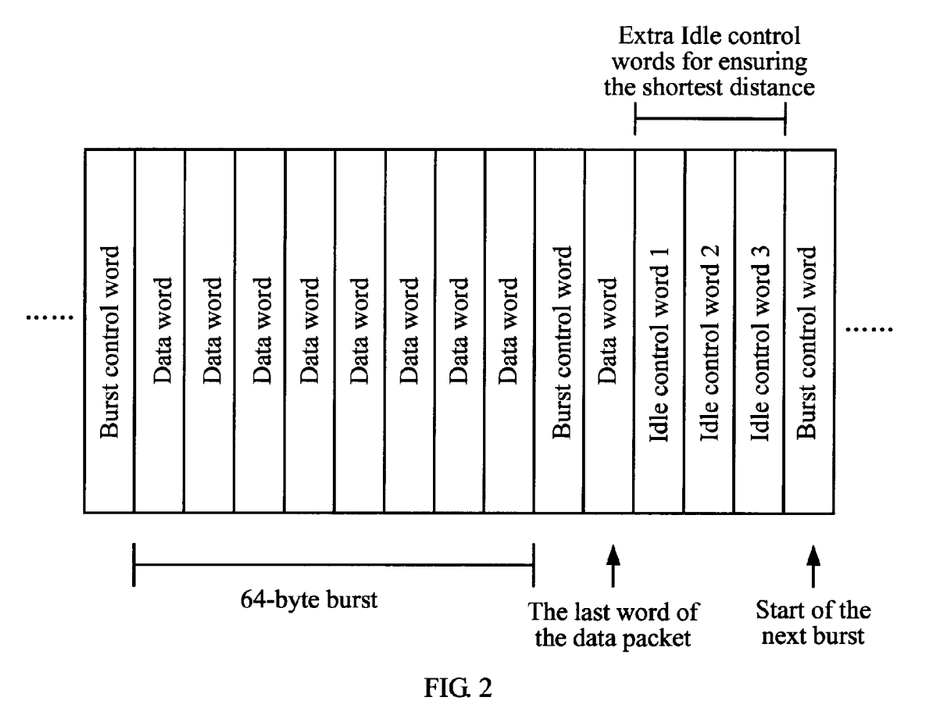
FIG. 2 is a schematic diagram of an example of a data stream transmitted in an Interlaken protocol.

In the Interlaken protocol, a schematic diagram of an example of a transmitted data stream is shown in FIG. 2. In FIG. 2, Burst control words, data payloads and Idle control words are sent serially. Data payloads are provided between two adjacent Burst control words. When the length of the data payloads between the two adjacent Burst control words does not satisfy the minimum interval between two adjacent Burst control words defined by the Interlaken protocol, Idle control words are filled between the two adjacent Burst control words. As shown in FIG. 2, a first Burst control word is followed by data payloads having the Burst length of 64 bytes. A second Burst control word is followed by a last data payload in the same group as that of the previous data payloads, and then followed by Idle control words that are filled to satisfy BurstShort.

Figure 3:
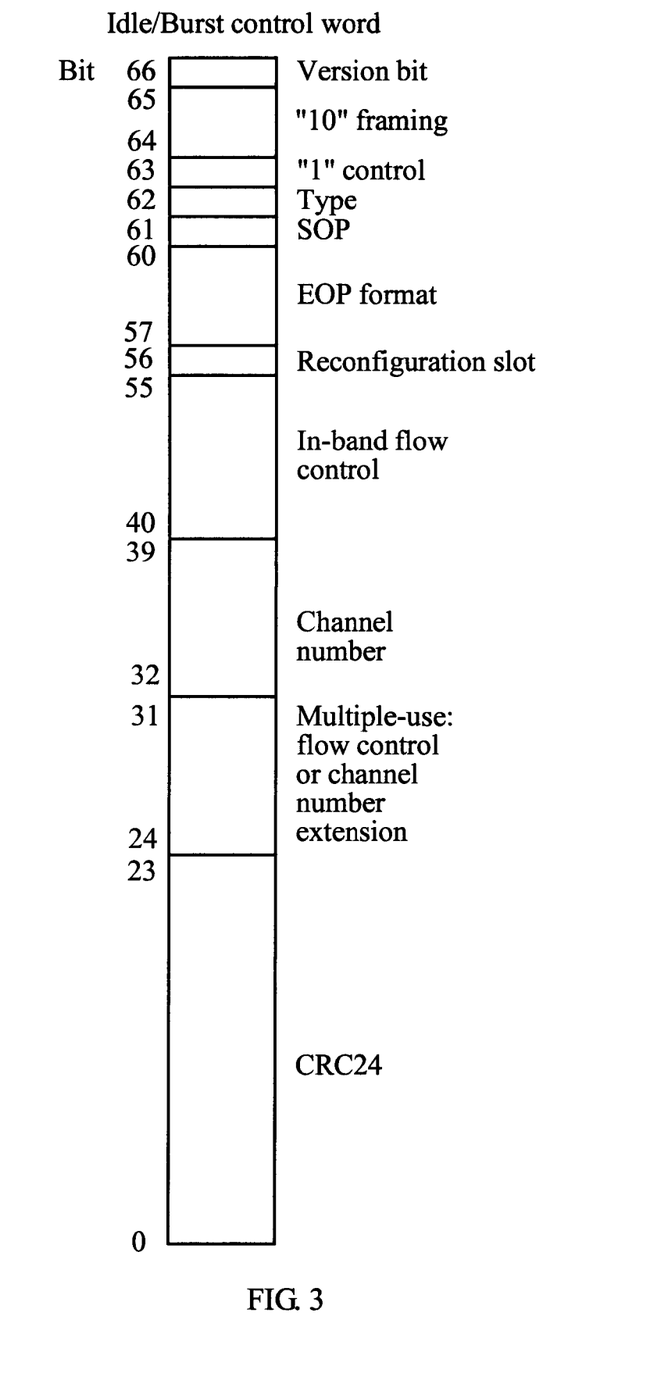
FIG. 3 is a schematic diagram of a data structure of a control word used in the Interlaken protocol.

Data structures of both a Burst control word and an Idle control word (both collectively referred to as a control word in the following) are shown in FIG. 3. It can be seen from FIG. 3 that, a 40th bit to a 55th bit is an In-Band Flow Control field, and a 24th bit to a 31st bit is a Multiple-Use field.

Specifically, in S110, information is received from multiple information channels of a data sending device, where the multiple information channels are divided into at least two channel groups, and a group number is set for the at least two channel groups respectively.

Multiple information channels may be grouped according to the number of the information channels, so as to obtain at least two channel groups. Definitely, for the specific grouping method, the information channels may also be grouped according to the specific number of channels whose control information can be transferred in the flow operation information that is returned by the data receiving device to the data sending device. Definitely, only a part of the information channels may also be grouped, while other information channels remain unchanged.

After the grouping, different group numbers may be allocated to each channel group, so as to differentiate them from each other. For example, when 256 information channels exist, it is assumed that 16 information channels form one group, and then totally 16 groups are formed. Group numbers allocated to the 16 groups may be binary numbers of four bits. For example, the group number 0000 is allocated to a first group, the group number 0001 is allocated to a second group, the group number 0010 is allocated to a third group, and so forth, and the group number 1111 is allocated to a sixteenth group.

In the embodiment of the present invention, after a channel group is determined, control information corresponding to each information channel may be determined according to a mapping relationship between an information channel and a control information queue in flow operation information. For example, if the 256 information channels are divided into 16 groups in sequence from the beginning to the end, each group includes 16 information channels, and group numbers are allocated in the foregoing group number allocation manner, a first group corresponds to a 0th information channel to a 15th information channel, a sixth group corresponds to a 80th information channel to a 95th information channel, and so on.

In S120, when an information channel requires flow adjustment, flow operation information of a channel group including the information channel is generated, where the flow control message includes a group number of the channel group including the information channel requiring flow adjustment, and control information of each information channel in the channel group.

The data receiving device may store the received data in a buffer area. For each information channel, whether flow of each information channel needs to be adjusted may be determined according to the remaining capacity of the buffer area corresponding to the information channel, the receiving speed of a data stream of the information channel and/or the processing speed of the data stream of the information channel. For example, if the remaining capacity of the buffer area corresponding to a certain information channel is small, and the data receiving device has a processing speed of the data stream of the information channel lower than the receiving speed of the data stream of the information channel, it means that overflow may occur afterwards. In order to avoid the overflow, the data receiving device sets the control information corresponding to the information channel in the flow operation information as 0 for example, so as to indicate that the data sending of the information channel is slowed or stopped. On the contrary, if the remaining capacity of the buffer area corresponding to a certain information channel is large, and the data receiving device has a processing speed of the data stream of the information channel higher than or equal to the receiving speed of the data stream of the information channel, it means that sufficient space exists for buffering the data that is afterwards received. In order to improve the data transmission efficiency, the data receiving device sets the control information corresponding to the information channel as 1 for example, so as to indicate that the data sending of the information channel may be accelerated or continued. Definitely, the control information may adopt more bytes, so as to more flexibly record more diversified adjustment manners, such as the back pressure mechanism and the acceleration.

The data receiving device detects information flow of each information channel to determine whether it is necessary to adjust the flow of the information channel. When the data receiving device determines that it is necessary to adjust flow of one or more information channels, flow operation information is generated for the channel group including the information channel. As in the foregoing example, when the data receiving device determines that a 16th information channel requires flow control, flow operation information is generated for all information channels in the second group including the 16th information channel. When the flow operation information is generated, the control information of the flow of all the information channels in the group and the group number of the group may be included in the flow operation information. Through the group number carried in the flow operation information, the data receiving device may inform the data sending device of an information channel corresponding to the control information in the currently sent flow operation information.

According to the embodiment of the present invention, in the Interlaken protocol, the generated flow operation information may be a control word, including the Burst control word and the Idle control word. As shown in FIG. 2, the flow operation information of the information channel may be carried in the In-Band Flow Control field of the control word, and the group number may be carried in the Multiple-Use field of the control word, so as to send the changed flow operation information to the data sending device in time. For example, in the foregoing example, flow operation information of a channel group may be filled in the In-Band Flow Control field, and a channel group number of 4 bits may be filled in lower four bits of the Multiple-Use field.

In S130, the flow operation information is sent to the data sending device so as to perform flow control.

After the flow operation information is generated, the message is sent to the data sending device, so as to enable the data sending device to update the changed flow operation information in time, thereby more effectively performing the flow control.

According to the method for controlling information channel flow in the embodiment of the present invention, information channels for information transmission are divided into at least two channel groups, and when the data receiving device determines that flow operation information of an information channel is changed, flow operation information of each information channel in the channel group with the changed flow operation information is preferentially transferred, instead of transferring flow operation information of each information channel in each channel group in sequence, so as to send the changed flow operation information to the data sending device in time, and enable the data sending device to timely update the changed flow operation information in combination with the group number that is sent together with the changed flow operation information, thereby improving the transmission efficiency of the flow operation information of the information channels and reducing the transmission delay of the flow operation information.

Figure 4:
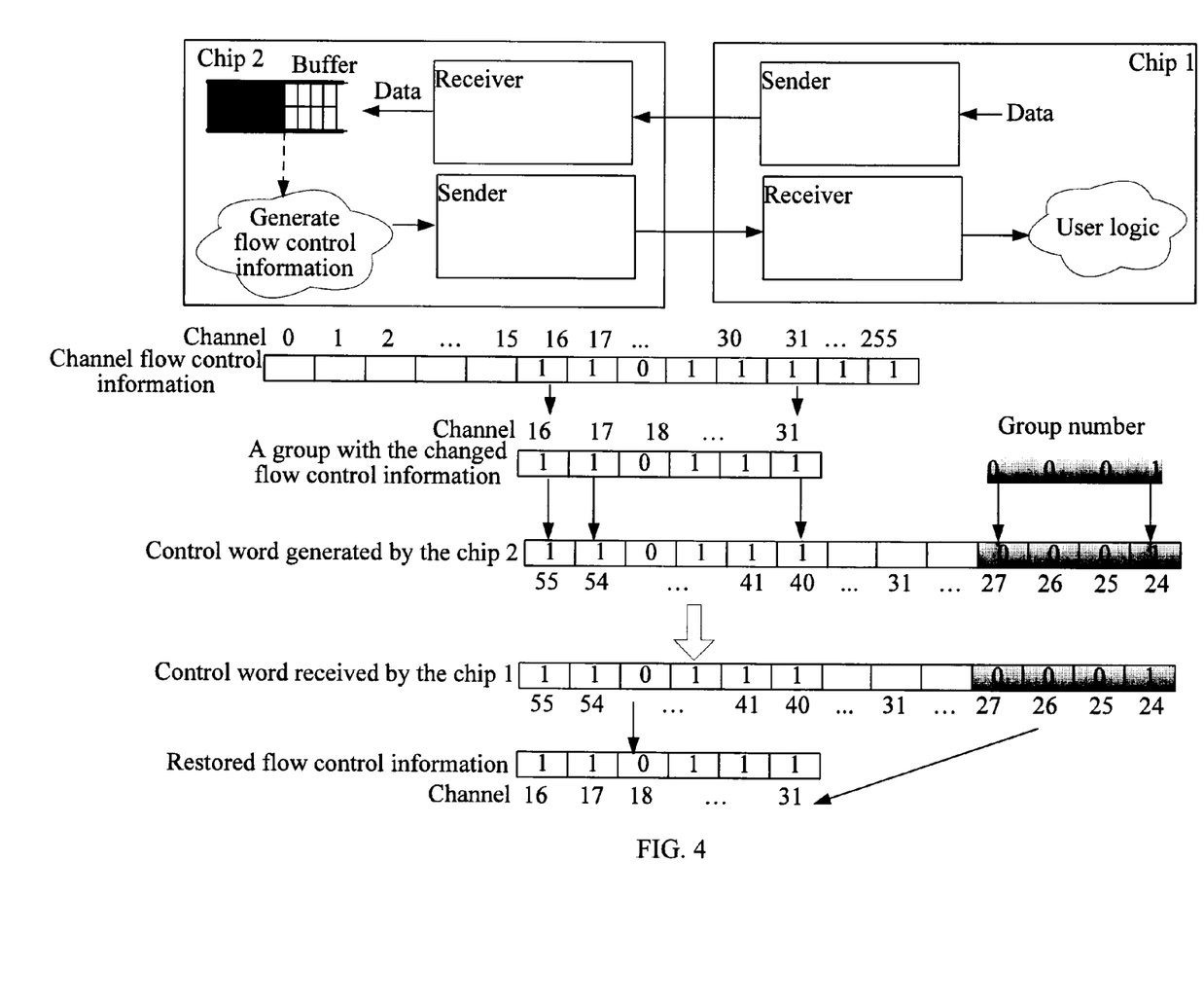
FIG. 4 is a schematic diagram of transmission of a data stream of flow operation information at an information channel level according to an embodiment of the present invention.

FIG. 4 shows an example of transmission of a data stream of flow operation information at a transmission information channel level according to an embodiment of the present invention.

In FIG. 4, a chip 1 is similar to a chip 2, and the difference lies in that the chip 2 determines which information channel(s) requires flow adjustment in the flow operation information of the information channel, fills a flow control policy (control information) of each information channel in a channel group corresponding to the information channel requiring flow adjustment in a control word, further fills the group number of the group in the control word, and sends to the chip 1 the group number together with the flow control policy (control information). For example, when a 16th information channel requires flow adjustment, a control policy of each information channel in the second channel group including the 16th information channel is filled in the In-Band Flow Control field of the control word, and a group number 0001 is filled in the Multiple-Use field of the control word. The chip 1 determines which information channels have flow operation information corresponding to the flow operation information carried in the control word according to the group number, so as to perform the update and the flow control. For example, the chip 1 determines that flow operation information of the 16th information channel to a 31st information channel currently needs to be updated according to the group number 0001.

In the embodiment of the present invention, the chip 2 sends control policies of information channels based on the group, so that flow operation information of an information channel requiring flow adjustment may be preferentially transferred in the case of ensuring that the chip 1 can identify the information channel, thereby improving the timeliness of the flow adjustment.

The chip 2 controls information channel flow of the chip 1 in the above description, and the chip 1 may also control information channel flow of the chip 2, and the procedure of the chip 1 is similar to that of the chip 2, and will not be described again in order to avoid repetition.

Figure 5:
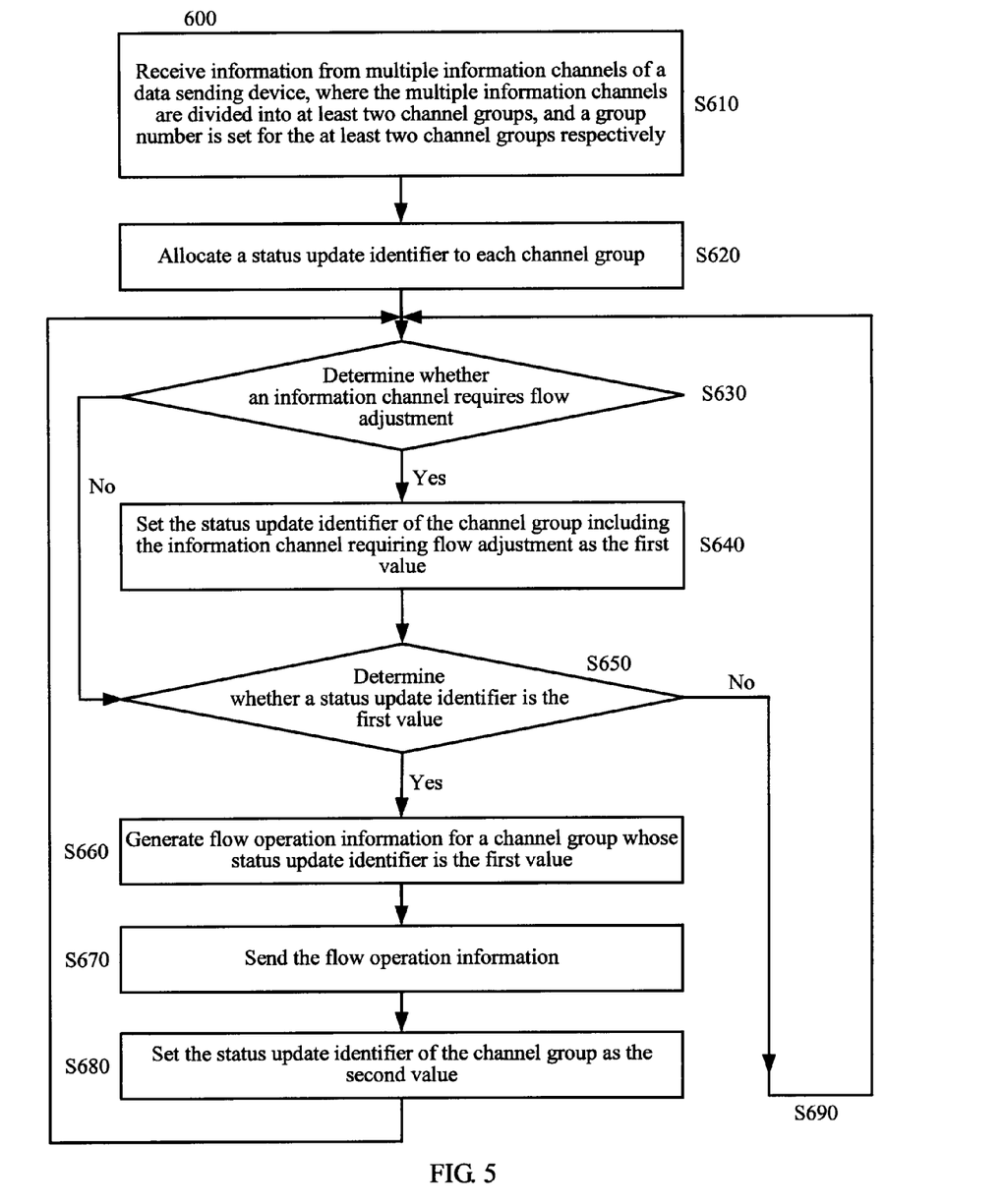
FIG. 5 is a flowchart of another method for controlling information channel flow according to an embodiment of the present invention.

In the following, a flowchart of another method 600 for controlling information channel flow according to an embodiment of the present invention is described with reference to FIG. 5.

S610: Receive information from multiple information channels of a data sending device, where the multiple information channels are divided into at least two channel groups, and a group number is set for the at least two channel groups respectively. S610 is basically the same as S110 in FIG. 1, and will not be described herein again.

S620: Allocate a status update identifier to each channel group.

Each status update identifier corresponds to a particular channel group, and is used to indicate whether one or more information channels in the channel group require flow adjustment, for example, reducing or increasing the flow. In the embodiment of the present invention, the status update identifier may be used to indicate whether an information channel in the channel group requires adjustment of a flow control manner, and the status update identifier includes a first value indicating that the adjustment is required and a second value indicating that the adjustment is not required. For example, the status update identifier may be a binary number, where 1 is used to indicate that an information channel in a corresponding channel group requires adjustment of a flow control policy, and 0 is used to indicate that no information channel in the corresponding channel group requires adjustment of a flow control policy.

Although the procedure of allocating the status update identifier is described to be performed after the procedure of allocating the group number, it may occur to persons skilled in the art that, the procedure of allocating the status update identifier may also be performed before or at the same time as the procedure of allocating the group number.

An initial value may be set for status update identifiers, for example, all the status update identifiers are the first value, all the status update identifiers are the second value, or a part of the status update identifiers are the first value and a part of the status update identifiers are the second value.

S630: Determine whether an information channel requires flow adjustment.

A flow status of each information channel may be determined according to a buffer status, a receiving speed, and a processing speed, and whether a flow control policy for a particular information channel needs to be changed is judged according to a current flow status, for example, the flow output is reduced for an information channel having abnormal flow in a previous period, while the flow control needs to be removed in the current period; for another example, the information channel being normal in the previous period has abnormal flow in the current period; or, the flow needs to be increased or reduced for other reasons. If it is determined that the flow of the information channel needs to be controlled, the procedure proceeds to S640; otherwise, the procedure proceeds to S650.

S640: Set as the first value the status update identifier of the channel group including the information channel requiring flow adjustment.

If information channels in multiple channel groups require flow adjustment, multiple status update identifiers corresponding to the multiple channel groups may be set as the first value.

S650: Determine whether a status update identifier is the first value.

If a value of a status update identifier is the first value, the procedure proceeds to S660; otherwise, the procedure proceeds to S690.

S660: Generate flow operation information for a channel group whose status update identifier is the first value, where the flow operation information includes control information of each information channel in the channel group and a group number of the channel group.

According to the embodiment of the present invention, the generated flow operation information may be a control word that is based on the Interlaken protocol. In the control word, an In-Band Flow Control field may be used to bear the control information of each information channel, and a Multiple-Use field may be used to bear the group number of the channel group.

S670: Send the flow operation information, so as to instruct the data sending device to adjust the flow.

S680: after sending the flow operation information, set the status update identifier of the channel group whose status update identifier is the first value as the second value.

After the flow operation information is sent out, the status update identifier of the channel group is set as the second value, so as to indicate that a flow adjustment operation of the channel group is already processed.

It may occur to persons skilled in the art that, S680 may also be executed before S670. That is, as long as the flow operation information is generated, the status update identifier of the group may be set as the second value. The generated flow operation information enters a sending queue to wait for being sent.

After S680, the procedure returns to S630, so as to continue performing the flow control procedure.

According to the foregoing technical solution, the group(s) in which flow operation information of information channels needs to be updated can be more conveniently determined through the status update identifier. In this case, the flow operation information of the information channels does not need to be continuously detected, and the channel group(s) in which the flow operation information of the information channels needs to be updated can be determined through the status update identifier, so that the flow operation information of the information channels in the channel group corresponding to the status update identifier having the first value can be preferentially sent, and the flow operation information of the information channels in the channel group corresponding to the status update identifier having the second value is skipped, thereby improving the transmission efficiency of the flow operation information of the information channels and reducing the transmission delay of the flow operation information.

In the following, with reference to FIG. 6, a flowchart of still another method 700 for controlling information channel flow according to an embodiment of the present invention is described from the perspective of a data sending device.

Figure 6:
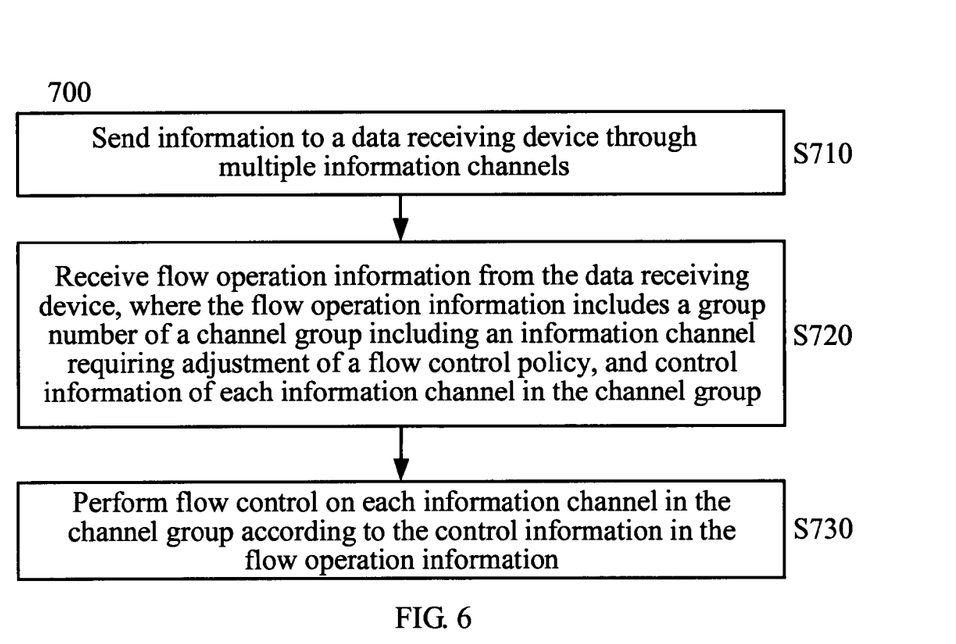
FIG. 6 is a flowchart of still another method for controlling information channel flow according to an embodiment of the present invention.

As shown in FIG. 6, the method 700 includes the following steps.

S710: Send information to a data receiving device through multiple information channels, where the multiple information channels are divided into at least two channel groups, and a group number is set for the at least two channel groups respectively.

S720: Receive flow operation information from the data receiving device, where the flow operation information includes a group number of a channel group including an information channel requiring adjustment of a flow control policy, and control information of each information channel in the channel group.

S730: Perform flow control on each information channel in the channel group according to the control information in the flow operation information. The flow control includes reducing the flow, increasing the flow, or keeping the flow unchanged.

According to the method for controlling information channel flow in the embodiment of the present invention, the data sending device receives the flow operation information carrying flow operation information of each information channel in a channel group that is located with changed flow operation information that is transferred in time by the data receiving device when the data receiving device determines that flow operation information of an information channel is changed, instead of receiving the sequentially transferred flow operation information that in sequence carries flow operation information of information channels in each channel group, so that the data sending device can timely update the changed flow operation information in combination with the group number that is sent together with the changed flow operation information, thereby improving the transmission efficiency of the flow operation information of the information channels, reducing the transmission delay of the flow operation information, and better adapting to the current transmission condition.

Specifically, for S710 and S720, reference may be made to the relevant content in the foregoing method 100 and/or the method 600, and details will not be described herein again. For example, the received flow operation information may be a control word that is based on the Interlaken protocol, and the control word carries flow operation information of each information channel in the channel group that is located with the changed flow operation information and carries the group number of the channel group. In the control word, an In-Band Flow Control field may be used to carry the flow operation information of each information channel in the channel group, and a Multiple-Use field may be used to carry the group number.

In S730, according to the group number carried in the flow operation information, the data sending device may determine, based on a preset corresponding relationship, which information channels require flow control at this time. The corresponding relationship may be determined with reference to the relevant content in the foregoing method 100. After the information channels whose flow operation information needs to be updated are determined, a flow control message carried in a flow update message is used to update the flow operation information. For example, in the Interlaken protocol, the data sending device may determine the group number according to the Multiple-Use field of the control word, determine, through group number, which channel group's information channels require flow control, and then use the control information carried by the In-Band Flow Control field of the control word to adjust the flow of the information channels requiring flow control.

In the foregoing, the method for controlling information channel flow according to the embodiment of the present invention is described, and in the following, a structural block diagram of a device for controlling information channel flow according to an embodiment of the present invention is described with reference to FIG. 7 to FIG. 9.

Figure 7:
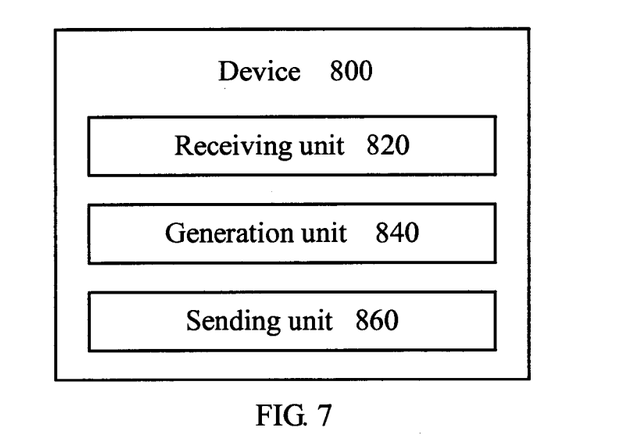
FIG. 7 is a structural block diagram of a device for controlling information channel flow according to an embodiment of the present invention.

FIG. 7 is a structural block diagram of a device 800 for controlling information channel flow according to an embodiment of the present invention.

The device 800 includes a receiving unit 820, a generation unit 840 and a sending unit 860. The receiving unit 820 may be configured to receive information from multiple information channels of a data sending device, where the multiple information channels are divided into at least two channel groups, and a group number is set for the at least two channel groups respectively. The generation unit 840 may be configured to generate flow operation information when at least one of the multiple information channels requires flow adjustment, where the flow operation information includes a group number of a channel group including the information channel requiring flow adjustment, and control information of each information channel in the channel group including the information channel requiring flow adjustment. The sending unit 860 may be configured to send the flow operation information to the data sending device so as to perform flow control.

For the foregoing and other operations and/or functions of the receiving unit 820, the generation unit 840 and the sending unit 860, reference may be made to the description of the foregoing method 100 and/or 600, and details will not be described herein again in order to avoid repetition.

According to the device for controlling information channel flow in the embodiment of the present invention, information channels for information transmission are divided into at least two channel groups, and when the device determines that flow operation information of an information channel is changed, flow operation information of each information channel in the channel group with the changed flow operation information is preferentially transferred, instead of transferring flow operation information of information channels in each channel group in sequence, so as to send the changed flow operation information to the data sending device in time, and enable the data sending device to timely update the changed flow operation information in combination with the group number that is sent together with the changed flow operation information, thereby improving the transmission efficiency of the flow operation information of the information channels and reducing the transmission delay of the flow operation information.

Figure 8:
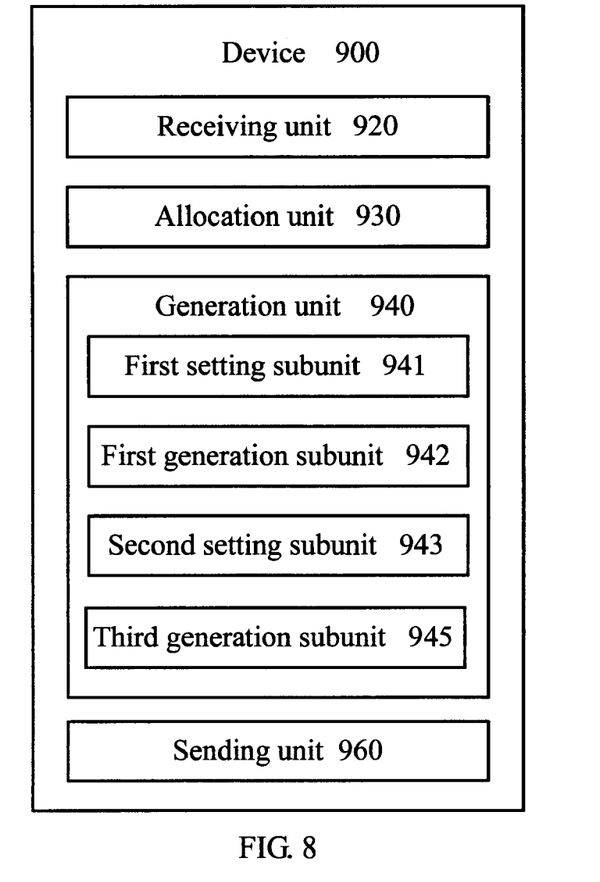
FIG. 8 is a structural block diagram of another device for controlling information channel flow according to an embodiment of the present invention.

FIG. 8 is a structural block diagram of a device 900 for controlling information channel flow according to another embodiment of the present invention.

The illustration of the same part is omitted, and in the embodiment of the present invention, the device 900 further includes an allocation unit 930. The allocation unit 930 may be configured to allocate a status update identifier to each channel group, where the status update identifier includes a first value used to indicate that an information channel in a channel group requires flow adjustment, and a second value used to indicate that no information channel in the channel group requires flow adjustment.

In the embodiment of the present invention, a generation unit 940 of the device 900 may include a first setting subunit 941, a first generation subunit 942 and a second setting subunit 943. The first setting subunit 941 may be configured to set a status update identifier of a channel group as the first value when determining that an information channel in the channel group requires flow adjustment. The first generation subunit 942 may be configured to generate the flow operation information when determining that the status update identifier is the first value. The second setting subunit 943 may be configured to set the status update identifier as the second value after the flow operation information is generated or after the flow operation information is sent to the data sending device. According to the embodiment of the present invention, the generation unit 940 may include a third generation subunit 945. The third generation subunit 945 may be configured to generate a control word that is based on the Interlaken protocol, where a Multiple-Use field of the control word bears a group number of the channel group, and an In-Band Flow Control field of the control word bears control information of each information channel in the channel group.

According to the embodiment of the present invention, the receiving unit 920 may further be configured to receive information from multiple information channels of the data sending device, where the multiple information channels are divided into at least two channel groups based on the largest amount of flow operation information that can be borne by the control word.

According to the foregoing device for controlling information channel flow, the channel group(s) whose flow operation information needs to be sent can be more conveniently determined through the status update identifier allocated by the allocation unit. In this case, the flow operation information of the information channels does not need to be continuously detected, and the channel group(s) whose the flow operation information needs to be updated can be determined through the status update identifier, so that the sending unit can preferentially send the flow operation information of the channel group corresponding to the status update identifier having the first value, and skip the flow operation information of the channel group corresponding to the status update identifier having the second value, thereby improving the transmission efficiency of the flow operation information of the information channels and reducing the transmission delay of the flow operation information.

Figure 9:
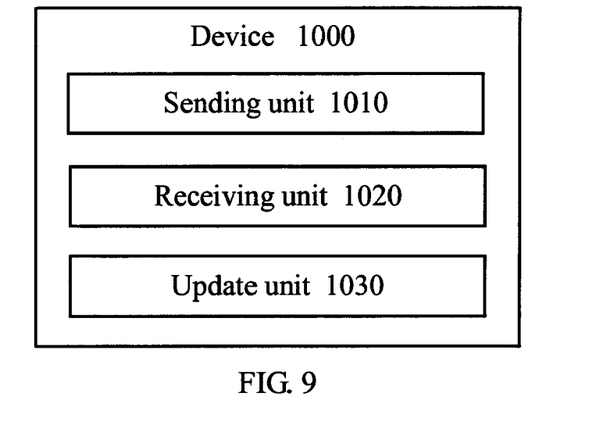
FIG. 9 is a structural block diagram of still another device for controlling information channel flow according to an embodiment of the present invention.

FIG. 9 is a structural block diagram of a device 1000 for controlling information channel flow according to an embodiment of the present invention.

As shown in FIG. 9, the device 1000 includes a sending unit 1010, a receiving unit 1020 and a flow control unit 1030. The sending unit 1010 may be configured to send information to a data receiving device through multiple information channels, where the multiple information channels are divided into at least two channel groups, and a group number is set for the at least two channel groups respectively. The receiving unit 1020 may be configured to receive flow operation information from the data receiving device, where the flow operation information includes a group number of a channel group with the changed flow operation information, and control information of each information channel in the channel group. The flow control unit 1030 may be configured to perform flow control on each information channel in the channel group according to the control information of the flow operation information.

According to the embodiment of the present invention, the flow operation information may be a control word that is based on the Interlaken protocol, where a Multiple-Use field of the control word bears a group number of the channel group, and an In-Band Flow Control field of the control word bears control information of each information channel in the channel group.

Persons skilled in the art should be aware that, the steps of the methods and the units described in the embodiments disclosed herein may be implemented through electronic hardware, computer software, or a combination of the electronic hardware and the computer software. To clearly illustrate the interchangeability of the hardware and the software, the steps and unites of the embodiments have been generally described according to their functions in the above description. Whether these functions are executed in hardware manner or in software manner depends upon the specific applications and design constraints of the technical solutions. Persons skilled in the art can use different methods for each specific application to realize the described functions, and such realization should not be interpreted as a departure from the scope of the present invention.

The steps of the methods described in the embodiments disclosed herein may be implemented by hardware, a software program executed by a processor, or a combination of the hardware and the software program executed by a processor. The software program may reside in a Random Access Memory (RAM), a memory, a Read-Only Memory (ROM), an electrically programmable ROM, an electrically erasable and programmable ROM, a register, a hard disk, a removable disk, a Compact Disk Read-Only Memory (CD-ROM), or any other forms of storage media known in the art.

Although some embodiments of the present invention are shown and described, persons skilled in the art should understand that, various modifications can be made to these embodiments without departing from the principle and the spirit of the present invention, as long as such modifications fall within the scope of the present invention.

What is claimed is:

1. A device for controlling information channel flow, comprising:
   a receiving unit, configured to receive information from multiple information channels of a data sending device, wherein the multiple information channels are divided into at least two channel groups, and each of the at least two channel groups comprises a group identification;
   a generation unit, configured to generate data streams for each of the at least two channel groups respectively, wherein each of the data streams carries a corresponding set of control words to indicate whether flow adjustment is needed for information channels in a corresponding channel group, and a group identification of the corresponding channel group; and
   a transmitting unit, configured to transmit the data streams to the data sending device to perform flow control, wherein data streams that carry corresponding sets of control words indicating that flow adjustment for at least one information channel is needed are transmitted before data streams that carry corresponding sets of control words indicating no flow adjustment is needed.

2. The device according to claim 1, further comprising:
   an allocation unit, configured to allocate a status update identifier to each of the channel groups, wherein the status update identifier comprises a first value for indicating that flow adjustment is required for the channel group, and a second value for indicating that no information channel in the channel group requires flow adjustment,
   wherein the generation unit comprises:
      a first setting subunit, configured to set a status update identifier of a channel group as the first value when it is determined that an information channel in the channel group requires flow adjustment;
      a first generation subunit, configured to generate the data stream of the channel group when it is determined that the status update identifier is the first value; and
      a second setting subunit, configured to set the status update identifier as the second value after the data stream of the channel group is generated or sent.

3. The device according to claim 1, wherein each of the control words includes 1 bit control information, wherein when the control information is "1", it indicates that the data sending device is capable of sending information through a corresponding information channel, and when the control information is "0", it indicates that the data sending device stops sending the information through the corresponding information channel.

4. A method for controlling information channel flow, comprising:
   receiving information from multiple information channels of a data sending device, wherein the multiple information channels are divided into at least two channel groups, and each of the at least two channel groups comprises a group identification;
   determining whether any of the information channels requires flow adjustment;
   generating data streams for each of the at least two channel groups respectively, wherein each of the data streams carries a corresponding set of control words to indicate whether flow adjustment is needed for information channels in a corresponding channel group, and also a group identification of the corresponding channel group; and
   transmitting the data streams, wherein data streams that carry corresponding sets of control words indicating that flow adjustment for at least one information channel is needed are transmitted before data streams that carry corresponding sets of control words indicating no flow adjustment is needed.

5. The method according to claim 4, wherein the set of control words to indicate whether flow adjustment is needed for information channels are generated according to an Interlaken protocol.

* * * * *